US009947002B2

(12) United States Patent
Toomer et al.

(10) Patent No.: US 9,947,002 B2
(45) Date of Patent: Apr. 17, 2018

(54) SECURE AUTHORIZATION OF CONTACTLESS TRANSACTION

(75) Inventors: Christopher L. Toomer, Parker, CO (US); Steven E. Arthur, Castle Rock, CO (US)

(73) Assignee: First Data Corporation, Greenwood Village, CO (US)

( * ) Notice: Subject to any disclaimer, the term of this patent is extended or adjusted under 35 U.S.C. 154(b) by 1795 days.

(21) Appl. No.: 12/031,864

(22) Filed: Feb. 15, 2008

(65) Prior Publication Data
US 2009/0210308 A1 Aug. 20, 2009

(51) Int. Cl.
| | | |
|---|---|---|
| *G06Q 20/32* | (2012.01) | |
| *G06Q 20/20* | (2012.01) | |
| *G06Q 20/34* | (2012.01) | |
| *G06Q 20/40* | (2012.01) | |

(52) U.S. Cl.
CPC ............. *G06Q 20/32* (2013.01); *G06Q 20/20* (2013.01); *G06Q 20/3223* (2013.01); *G06Q 20/3278* (2013.01); *G06Q 20/352* (2013.01); *G06Q 20/40* (2013.01)

(58) Field of Classification Search
CPC ...................................................... G06Q 20/12
USPC ...................................................... 705/39–41
See application file for complete search history.

(56) References Cited

U.S. PATENT DOCUMENTS

| | | | | |
|---|---|---|---|---|
| 7,801,826 B2* | 9/2010 | Labrou | ................... | G06Q 20/02 705/50 |
| 2002/0116341 A1* | 8/2002 | Hogan | ................... | G06Q 20/04 705/64 |
| 2003/0004827 A1* | 1/2003 | Wang | ................. | 705/26 |
| 2003/0080183 A1 | 5/2003 | Rajasekaran et al. | | |
| 2003/0198348 A1 | 10/2003 | Mont et al. | | |
| 2004/0098350 A1* | 5/2004 | Labrou et al. | .................. | 705/64 |
| 2007/0011099 A1* | 1/2007 | Sheehan | ......................... | 705/65 |
| 2007/0067833 A1 | 3/2007 | Colnot | | |
| 2007/0125840 A1* | 6/2007 | Law | ....................... | G06Q 20/10 235/379 |

(Continued)

OTHER PUBLICATIONS

PCT International Search Report and Written Opinion dated Mar. 27, 2009; International Application No. PCT/US09/33789, 12 pages.

*Primary Examiner* — Bruce I Ebersman
(74) *Attorney, Agent, or Firm* — Kilpatrick Townsend & Stockton LLP

(57) ABSTRACT

Methods, systems, and machine-readable media are disclosed for securely authorizing a financial transaction utilizing an electronic payment credential. According to one embodiment, a method of authorizing a financial transaction utilizing an electronic payment credential can comprise maintaining information identifying an account associated with the electronic payment credential. The information can also identify one or more electronic devices authorized to use the electronic payment credential. A request to authorize the transaction can be received. The request can include information identifying an electronic device presenting the payment credential. The transaction can be authorized based at least in part on the information identifying the account. Authorizing can comprise determining the electronic device presenting the payment credential is one of the electronic devices authorized to use the electronic payment credential.

13 Claims, 9 Drawing Sheets

(56) References Cited

U.S. PATENT DOCUMENTS

| | | | |
|---|---|---|---|
| 2007/0255662 A1* | 11/2007 | Tumminaro | G06Q 20/027 705/79 |
| 2008/0010215 A1 | 1/2008 | Rackley, III et al. | |
| 2008/0103984 A1* | 5/2008 | Choe et al. | 705/76 |
| 2009/0119190 A1* | 5/2009 | Realini | G06Q 20/04 705/30 |
| 2010/0153273 A1* | 6/2010 | Sellars et al. | 705/67 |

\* cited by examiner

SECURE AUTHORIZATION OF CONTACTLESS TRANSACTION

BACKGROUND OF THE INVENTION

Embodiments of the present invention generally relate to payment systems. More specifically, embodiments of the present invention relate to securely authorizing a financial transaction utilizing an electronic payment credential.

Various forms of wireless or contactless devices have been introduced for use in various types of transactions. For example, contactless transaction initiation is often performed with a "smart" card or other device such as a key fob or a mobile device such as a cell phone or Personal Digital Assistant (PDA) containing a memory and a processor. Such a card or device typically also includes Radio-Frequency IDentification ("RFID") or Near-Field Communications (NFC) components for contactless communication with a Point-Of-Sale (POS) device. The information stored in the memory of the device and communicated via the RFID or NFC components to the POS device is generally similar or identical to the information recorded on the magnetic stripe of a card, i.e., account number etc. Thus, in some cases, such devices may be utilized instead of more conventional cards.

Conveniently, accounts represented by information stored in such electronic devices, i.e., an electronic payment credential, can be programmed or provisioned to the electronic device in many different ways. For example, the information or credential can be downloaded to the device over-the-air, e.g., via a wireless connection with a service provider's network, pre-programmed onto the device, downloaded to the device from a client computer, manually entered by a user of the device, etc. However, it is important to assure that the account information is not provisioned to or used by electronic devices which are not authorized to utilize that account information. For example, a particular electronic credential may be authorized for use on one or a small group of electronic devices. To prevent theft, fraud, or accident use of the credential on devices which are not authorized to use the credential, system and methods should be used to authorize a financial transaction utilizing the electronic payment credential and the device presenting the credential.

BRIEF SUMMARY OF THE INVENTION

Methods, systems, and machine-readable media are disclosed for securely authorizing a financial transaction utilizing an electronic payment credential. For example, the electronic payment credential can comprise a credential representing a pre-paid account such as a gift card or other account. According to one embodiment, a method of authorizing a financial transaction utilizing an electronic payment credential can comprise maintaining information identifying an account associated with the electronic payment credential. The information can also identify one or more electronic devices authorized to use the electronic payment credential. A request to authorize the transaction can be received. The request can include information identifying an electronic device presenting the payment credential. The transaction can be authorized based at least in part on the information identifying the account. Authorizing can comprise determining the electronic device presenting the payment credential is one of the electronic devices authorized to use the electronic payment credential.

In some cases, the information identifying the electronic device presenting the payment credential can comprise a unique static identifier. For example, the unique static identifier comprises a device serial number. In other cases, the information identifying the electronic device presenting the payment credential can comprise a unique dynamic identifier. In such a case, prior to receiving the request to authorize the transaction, a unique device identifier can be generated, saved in the information identifying the account, and transferred to the electronic device. Then, after authorizing the transaction, a new unique device identifier can be generated, saved in the information identifying the account, and transferred to the electronic device for use in authorizing subsequent transactions. Alternatively, the unique dynamic identifier can comprise a combination of an account number for the account and a random value. For example, the random value can comprise an elapsed time since a previous transaction, a time of occurrence of a last transaction, Greenwich Mean Time (GMT), or other value.

According to another embodiment, a system for authorizing a financial transaction utilizing an electronic payment credential can comprise a mobile electronic device adapted to maintain the electronic payment credential and initiate the financial transaction utilizing the electronic payment credential. For example, the system may include a point-of-sale device and the mobile electronic device can initiate the financial transaction by presenting the payment credential to the point-of-sale device. The electronic payment credential can comprise, for example, a credential representing a pre-paid account such as a gift card or other account. The system can also include an acquirer system adapted to maintain information identifying an account associated with the electronic payment credential. The information can identify one or more electronic devices authorized to use the electronic payment credential. The acquirer system can receive a request to authorize the transaction, for example via the point-of-sale device, if any. The request can include information identifying the mobile electronic device initiating the financial transaction utilizing the electronic payment credential. The acquirer system can authorize the transaction based at least in part on the information identifying the account. Authorizing can comprise determining the mobile electronic device initiating the transaction is one of the electronic devices authorized to use the electronic payment credential.

In some cases, the information identifying the electronic device presenting the payment credential can comprise a unique static identifier. For example, the unique static identifier can comprise a device serial number for the mobile electronic device. In other cases, the information identifying the electronic device presenting the payment credential can comprise a unique dynamic identifier. For example, the acquirer system can be adapted to, prior to receiving the request to authorize the transaction, generate a unique device identifier, save the unique device identifier in the information identifying the account, and transfer the unique device identifier to the electronic device. The acquirer system can then, after authorizing the transaction, generate a new unique device identifier, save the new unique device identifier in the information identifying the account, and transfer the new unique device identifier to the electronic device for use in authorizing subsequent transactions. Alternatively, the unique dynamic identifier can comprise a combination of an account number for the account and a random value. For example, the random value can comprise an elapsed time since a previous transaction, a time of occurrence of a last transaction, Greenwich Mean Time (GMT), or other value.

According to yet another embodiment, a machine-readable medium can have stored thereon a series of instructions which, when executed by a processor, cause the processor to authorize a financial transaction utilizing an electronic payment credential by maintaining information identifying an account associated with the electronic payment credential, the information identifying one or more electronic devices authorized to use the electronic payment credential, receiving a request to authorize the transaction, wherein the request includes information identifying an electronic device presenting the payment credential, and authorizing the transaction based at least in part on the information identifying the account, wherein authorizing comprises determining the electronic device presenting the payment credential is one of the electronic devices authorized to use the electronic payment credential. For example, the electronic payment credential can comprise a credential representing a pre-paid account such as a gift card account. The information identifying the electronic device presenting the payment credential can comprise a unique static identifier or a unique dynamic identifier.

DETAILED DESCRIPTION OF THE INVENTION

Figure 1:
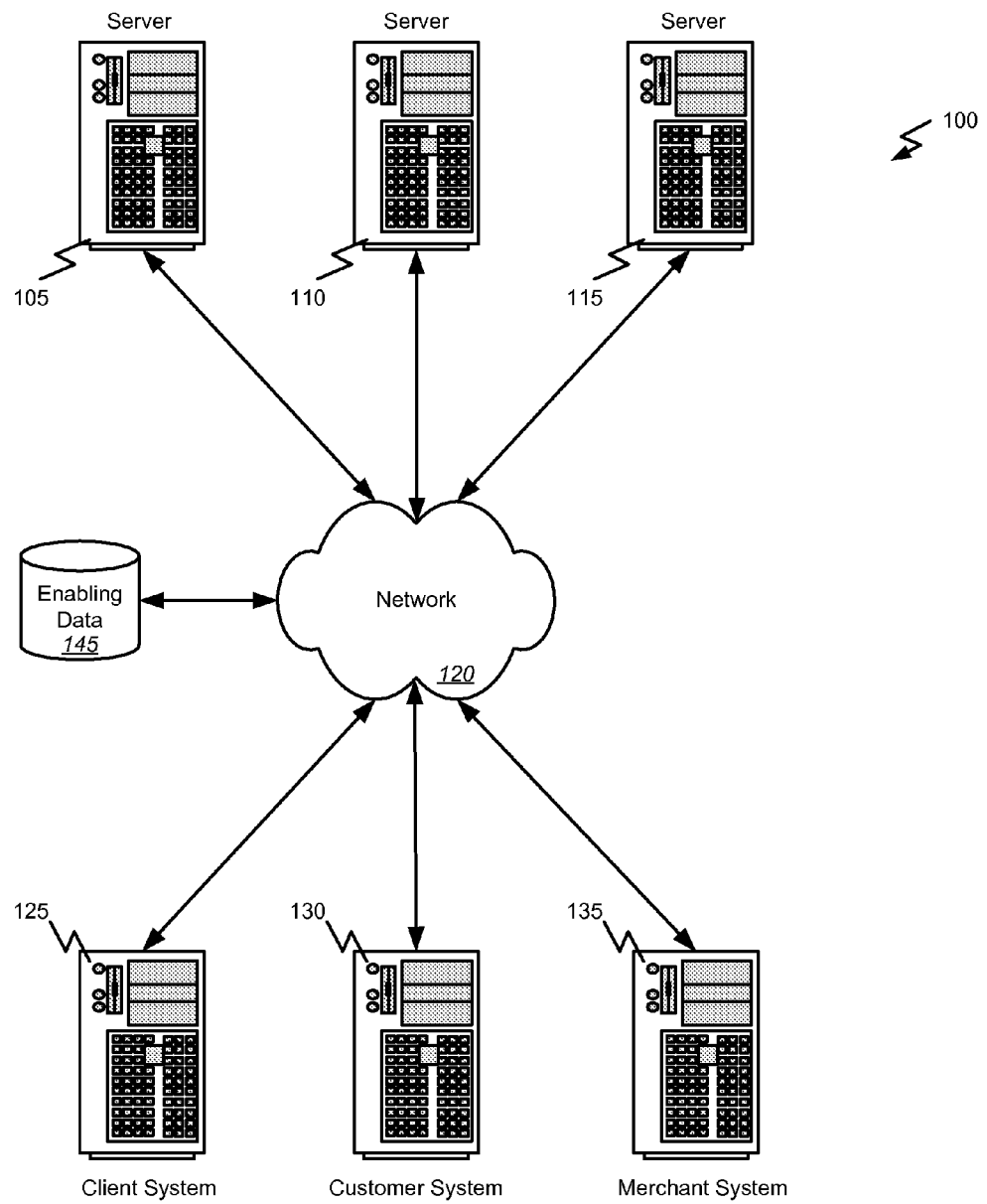
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for authorizing financial transactions initiated by or otherwise involving use of a contactless or mobile device. In some such embodiments, the processes are executed by an entity on behalf of one or more client organizations. The description below sometimes provides illustrations that use an example where a client organization is a financial institution, but there is no such requirement for the invention and the methods are intended also to be applicable to other types of organizations that make use of large collections of data. For example, embodiments of the invention may also be used for managing health-care documents or information.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings. For example, as used herein, the term "acquirer" is used to refer to a business entity that has a business relationship with a merchant, one or more financial institutions, and other entities and handles credit card and/or other financial transactions for and/or involving those entities. In such a context, an "acquirer system" is a system operated by an acquirer that processes and authorizes credit card and/or other transactions. Acquirer systems can include those operated by credit card processing entities, such as First Data Corporation, Greenwood Village, Colo. However, embodiments of the present invention are not limited to such financial services or payment processing. Thus, an acquirer system can be considered to be any system capable of receiving a communication from another system or entity and processing information on behalf of that entity.

The term "carrier" refers to a provider of a network and/or service for use by a mobile device. For example, a carrier can include, but is not limited to, a provider of a cellular or other wireless communications service for use by a mobile device. The terms "carrier" and "service provider" are used interchangeably herein and are intended to be synonymous. Similarly, the terms carrier network and service provider network are used interchangeably herein and are intended to be synonymous.

The term "mobile device" is used herein to refer to any small, likely handheld, electronic device that can be used to initiate or otherwise participate in a financial transaction. For example, a mobile device can include, but is not limited to, a cellular telephone, a Personal Digital Assistant (PDA), a smart card or other contactless device, etc. Exemplary devices that may be adapted for use as mobile devices in various embodiments of the present invention are described in co-pending and commonly assigned U.S. patent application Ser. No. 11/672,417 entitled "Contactless Electronic Wallet Payment Device" filed on Feb. 7, 2007; U.S. patent application Ser. No. 11/551,063 entitled "Presentation Instrument with Non-Financial Functionality" filed on Oct. 19, 2006; and U.S. Provisional Patent Application No. 60/833,022 entitled "Mobile Payment Device with Magnetic Stripe" filed on Jul. 24, 2006, each of which is incorporated herein by reference in its entirety for all purposes. As used herein, the terms mobile device and contactless device are intended to be synonymous.

A "mobile wallet" or "mobile wallet application" refers to a client software application that can reside on and/or be executed by a mobile device. According to one embodiment, the mobile wallet application can be adapted to store payment vehicle information. In some cases, the mobile wallet can allow storage of multiple payment vehicles and can provide a user interface that can be used to select a specific payment vehicle. Additionally, the mobile wallet can be adapted to provide security to deter fraudulent and unauthorized use of the payment vehicles. The terms mobile wallet and mobile wallet application are used interchangeably herein and are intended to be synonymous.

"Near Field Communication" (NFC) refers to short range (20 cm or less) wireless technology used to facilitate communication between electronic devices in close proximity. For example, embodiments of the present invention provide for the use of NFC and/or other relatively short range communications between a mobile device and a POS device such as when a user of the mobile device scans or waves the mobile device in front of or near the POS device when paying for goods or services.

A "payment network" refers herein to an infrastructure that supports the exchange of data in implementing payment transactions. It is anticipated that the data exchange typically proceeds between merchants and financial institutions. Examples of existing commercial networks that are included within the definition of "payment network" include the STAR/MAC network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature.

The term "payment vehicle" is used herein to refer to a method of payment. For example, payment vehicles can include, but are not limited to, credit, debit, stored-value, and other types of accounts. In some embodiments, a payment vehicle can include loyalty points or other value accumulated, for example, under a loyalty program.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers, but may also be in other locations. For instance, certain automatic teller machines "ATMs" may be equipped to support transactions for the sale of movie or sporting-event tickets even remote from the merchant location. Other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe, an RFID chip, NFC communications, or other information from a mobile device, contactless device, card, etc. Exemplary devices that may be adapted for use in various embodiments of the present invention are described in the following commonly assigned applications, the entire disclosures of which are incorporated herein by reference for all purposes: U.S. Provisional Patent Application No. 60/147,889, entitled "Integrated Point OF Sale Device," filed Aug. 9, 1999 by Randy J. Templeton et al.; U.S. patent application Ser. No. 09/634,901, entitled "Point of Sale Payment System," filed Aug. 9, 2000 by Randy J. Templeton et al.; U.S. patent application Ser. No. 10/116,689, entitled "Systems and Methods for Performing Transactions at a Point-of-Sale," filed Apr. 3, 2002 by Earney Stoutenburg et al.; U.S. patent application Ser. No. 10/116,733, entitled "Systems and Methods for Deploying a Point-of-Sale System," filed Apr. 3, 2002 by Earney Stoutenburg et al.; U.S. patent application Ser. No. 10/116,686, entitled "Systems and Methods for Utilizing A Point-of-Sale System," filed Apr. 3, 2002 by Earney Stoutenburg et al.; and U.S. patent application Ser. No. 10/116,735, entitled "Systems and Methods for Configuring a Point-of-Sale System," filed Apr. 3, 2002 by Earney Stoutenburg.

A "POS processing system" refers to a computational system used by merchants to control communications between POS devices and payment networks. Such systems may be run internally by merchants, may be run by merchant consortia, or may be outsourced to service providers in different embodiments. Some exemplary POS processing systems which may be adapted to operate with embodiments of the present invention are described in commonly assigned U.S. Pat. Nos. 6,886,742, 6,827,260 and 7,086,584, the complete disclosures of which are herein incorporated by reference.

A "primary account number" or "PAN" refers to a number assigned to an account. The PAN is generally assigned by a financial institution maintaining the account. In most embodiments, it is anticipated that the PAN will identify an account associated with the wireless device and be included as data stored by the memory of the wireless device. Identification of the PAN permits a financial institution that maintains the account to make a unique identification of the consumer initiating a payment or other transaction and determine which of potentially several accounts is to be used in supporting the transaction.

The terms "real time" or "near real time" are used herein to refer to a process or action that occurs within a relatively short time. Importantly, the terms real time and near real time are not intended to imply an immediate or instantaneous results or action. Rather, the terms are used to refer to processes or actions that can be performed relatively quickly such as within several seconds or minutes.

The term "user" refers to an entity, typically a person, that is associated with a particular mobile device. Typically, the user is the person that owns, uses, or leases the mobile device and/or controls the content and use of the payment vehicles maintained within the mobile wallet of the device.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels, and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium. One or more processors may perform the necessary tasks.

Embodiments of the present invention provide methods, systems, and machine-readable media for securely authorizing a financial transaction utilizing an electronic payment credential. For example, the electronic payment credential can comprise information representing an account including but not limited to a pre-paid account such as a gift card or other account. Generally speaking, a mobile device such as a cell phone, PDA, MP3 player, or other device can be adapted to maintain account information related to one or more financial accounts. For example, information such as a bank name, account number, account type, etc can be maintained in the device in and/or accessible by a mobile wallet. In other cases, identifying information other than an account number may be stored in or by the mobile wallet. For example, rather than storing an account number, the mobile wallet may store or generate a unique identifier for use by other systems in identifying one or more accounts associated with the mobile wallet.

Regardless of the exact form or format of the information or credential, information identifying an account associated with the electronic payment credential can be maintained, for example by an acquirer system. The information can also identify one or more electronic devices authorized to use the electronic payment credential. A request to authorize the transaction can be received by the acquirer or other system. The request can include information identifying an electronic device presenting the payment credential. The transaction can be authorized based at least in part on the information identifying the account. That is, authorizing the transaction can comprise determining whether the electronic device presenting the payment credential is one of the electronic devices authorized to use the electronic payment credential as identified in the account information. Additional details of the various embodiments of the present invention will be described below with reference to the figures.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g. 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc. The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents.

Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc.

Figure 2:
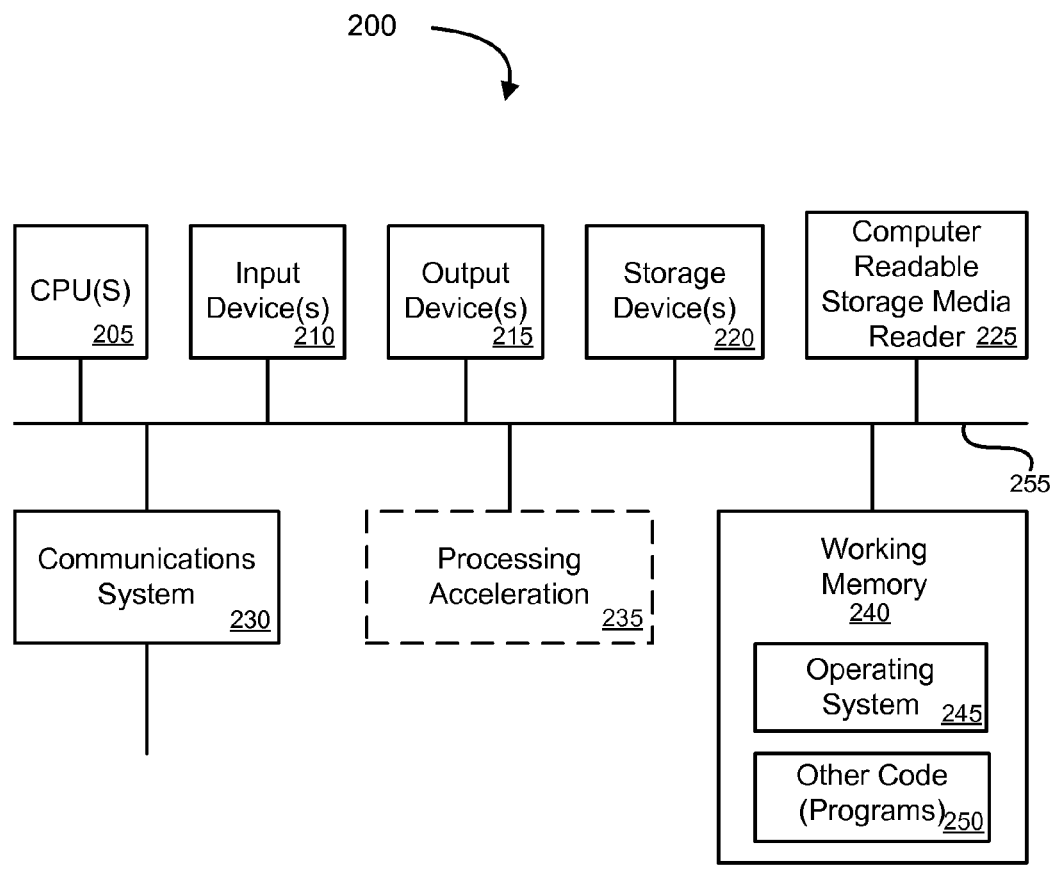
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g. a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
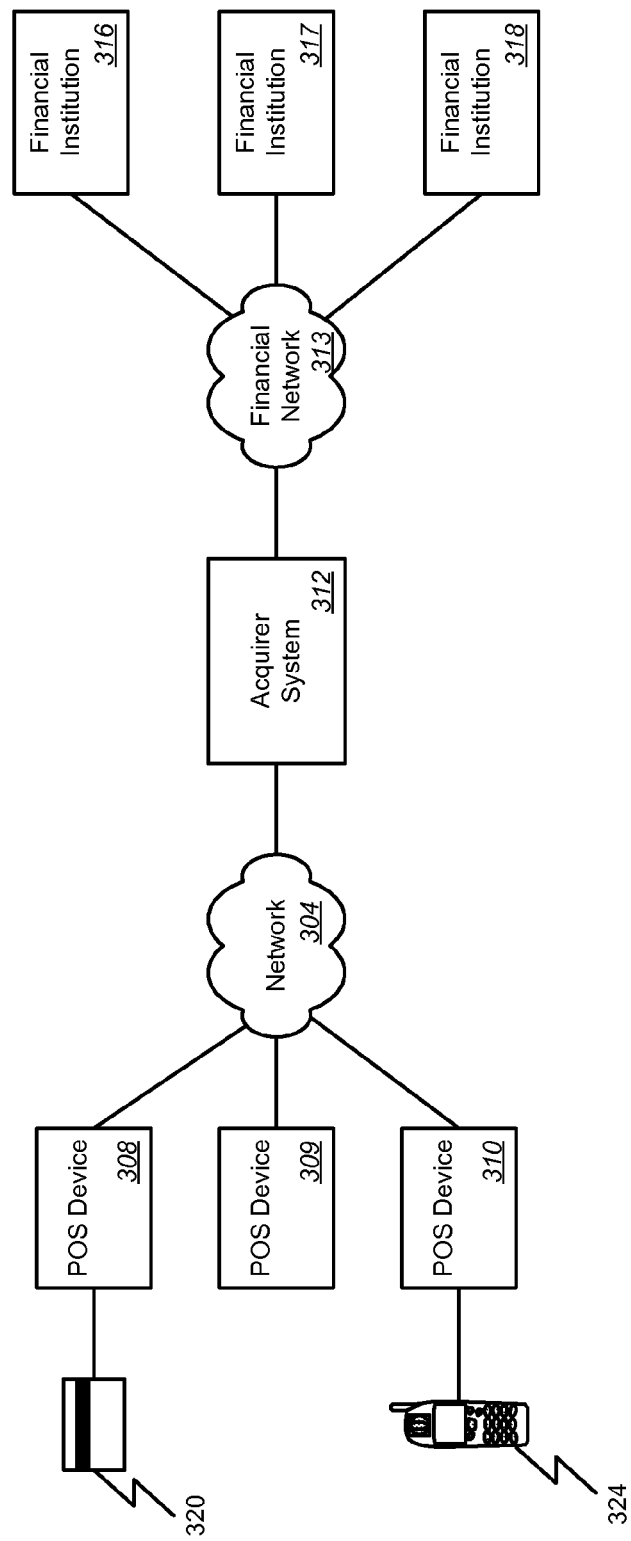
FIG. 3 is block diagram illustrating, at a high level, a system for processing transactions utilizing a mobile electronic device according to one embodiment of the present invention.

FIG. 3 is block diagram illustrating, at a high level, a system for processing transactions utilizing a mobile electronic device according to one embodiment of the present invention. Traditionally, a credit card may be issued to a customer by a financial institution such as a bank and typically displays a logo for an association that implements rules that govern aspects of use of the card. Account information is usually printed on the face of the card, specifying an account number and name of an authorized holder of the card. This information is also stored together with additional information on a magnetic stripe that is usually affixed to the back of the card. When the cardholder wishes to execute a transaction, such as a financial transaction for the purchase of goods and/or services, he presents the card 320 to a clerk at a merchant location, who swipes the card through a magnetic-stripe reader comprised by a point-of-sale device 308. Multiple point-of-sale devices 308-310 may have been provided at a variety of locations by an acquirer, who acts as an intermediary between merchants and the issuer financial institutions. As an intermediary, the acquirer coordinates transaction routing and performs a variety of backend processes.

The point-of-sale device 308 typically initiates a connection to an acquirer system 312 through a network 304 such as the Internet or another network as described above. A packet of information that includes information read from the magnetic stripe of the card 320, a merchant identifier, the date, and transaction amount are forwarded by the point-of-sale device 308 through the network 304 to the acquirer system 312. The acquirer system 312 may store some of the information and send an authorization request, via financial network 313, to the issuing financial institution 316, which may be identified from a portion of the account number read from the magnetic stripe. The transaction is authorized or denied depending on such factors as the validity of the cardholder name, the validity of the card number, the level of available credit in comparison with the transaction amount, and the like. If authorized, an authorization code is routed back through the acquirer system 312, which captures additional information and forwards the authorization code back to the originating point-of-sale device 308 so that the transaction may be completed. Periodically, such as at the end of every day, the transactions are settled by the acquirer initiating funds transfers that fund merchant bank accounts with total transaction amounts that may have resulted from multiple transactions by multiple customers.

Other types of accounts may operate with similar structures, although the details for each type of account are different. For example, use of a debit account typically requires that the customer provide a personal identification number ("PIN"), which must be validated before any authorization for the transaction can be provided. Authorization usually depends on the current level of funds actually in the identified account rather than on a credit level, and funds transfer is usually executed substantially contemporaneously with providing the authorization rather than performing periodic settlement. Other types of accounts may use arrangements that have similar differences in their particulars.

According to one embodiment, a mobile device 324 may be used in addition to or instead of a card or other token representing an account. Here, the mobile device 324 is shown for exemplary purposes in the form of a cellular telephone. However, as noted above, the mobile device 324 may be any of a variety of different mobile devices including but not limited to a PDA, MP3 player, etc. The mobile device 324 may communicate wirelessly with point-of-sale devices 314 that have been equipped for wireless communications, such as through an NFC connection.

According to one embodiment, the mobile device 324 can store and/or execute a mobile wallet application adapted to maintain account numbers and/or other information, i.e., electronic payment credentials, related to one or more financial accounts such as credit accounts, debit accounts, demand deposit accounts, stored value accounts, etc. maintained by one or more financial institutions 316-318. The mobile device 324, for example via the mobile wallet application, may allow the user to review accounts that are stored or identified in the mobile device 324 and select an account for a particular transaction such as a purchase. Upon selection of an account for use in the transaction, the user of the mobile device can scan or swipe the device 324 in front of or near the POS device 310 causing the credential of other information related to the selected account to be read from the mobile device 324 via the NFC connection.

The credential of other information regarding the selected account can identify the account to be used in supporting transactions, for example, including an indication of the financial institution 316 where that account is maintained, an account number, etc. Such identifications may conveniently be made with numerical strings similar to card numbers that have portions that identify a financial institution and portions that identify specific accounts. Additional information may include ownership details of the account, current balance levels for the account, and the like.

The point-of-sale device 308 typically initiates a connection to an acquirer system 312 through a network 304 such as the Internet or another network as described above. A packet of information that includes information read from the mobile device 324, a merchant identifier, the date, and transaction amount are forwarded by the point-of-sale device 310 through the network 304 to the acquirer system 312. The acquirer system 312 may store some of the information and send an authorization request, via financial network 313, to the issuing financial institution 318, which may be identified from a portion of the account number read from the mobile device 324. The transaction is authorized or denied depending on such factors as the validity of the account holder name, the validity of the account number, the level of available credit in comparison with the transaction amount, and the like. As will be described in detail below, authorization can also be based at least in part on determining whether the mobile device is authorized to use the account for which the information or credential has been provided. If authorized, an authorization code is routed back through the acquirer system 312, which captures additional information and forwards the authorization code back to the originating point-of-sale device 310 so that the transaction may be completed.

Figure 4:
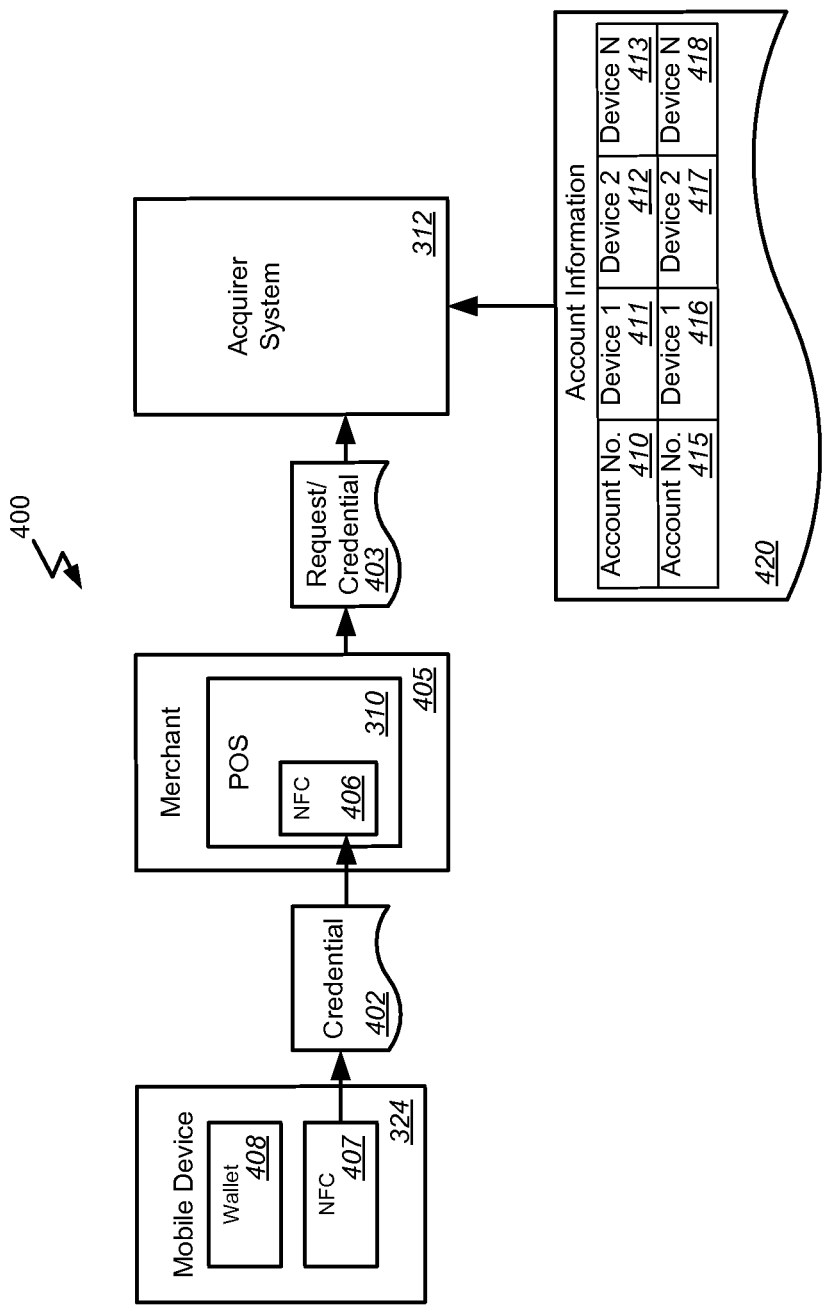
FIG. 4 is a block diagram illustrating additional details of the system of FIG. 3 according to one embodiment of the present invention.

FIG. 4 is a block diagram illustrating additional details of the system of FIG. 3 according to one embodiment of the present invention. In this example, the system 400 includes a mobile device 324 such as described above. The mobile device 324 can include a Near Field Communications (NFC) transponder 407 and can execute a mobile wallet application 408. The mobile device 324 can be adapted to maintain at least one set of information and/or credential related to a financial account in the mobile wallet 408 and communicate at least a subset of the information or credential 402 via the NFC transponder 407 upon initiation of a transaction such as a purchase. In the case where the user is making a purchase, from a merchant 405, the user can use the account to pay for the purchase by swiping or passing the mobile device 324 in front of or near an NFC equipped point of sale device 310 provided by the merchant 405.

The point of sale device 310 can also include an NFC transponder 406. The point of sale device 310 can be adapted to receive the credential 402 for the financial account from the mobile device 324 via the NFC transponder 406 and send a communication or request 403 related to the transaction that includes the credential and/or other information related to the financial account. For example, in the case of a consumer making a purchase using a credit, debit, stored value, or other account, the request can be a request to authorize the transaction.

The acquirer system 312 can be adapted to maintain information 420 identifying one or more accounts 410 and 415. The information can identify one or more electronic devices authorized to use the electronic payment credential. That is, for a given account 410 and 415, the account information 420 can also include information identifying one or more devices 411-413 and 416-418 which are authorized to use the account. The acquirer system 312 can be updated upon the device information 411-413 and 416-418 upon issuance of an account, modification of an account, etc. to indicate the one or more devices which the user, acquirer, issuer, or other entity indicates to be authorized for use with that account.

As noted, the acquirer system 312 can receive the request 403 to authorize the transaction and/or the electronic payment credential, for example via the point-of-sale device 310, if any. Also as noted, the request 402 can include information identifying the mobile electronic device 324 initiating the financial transaction utilizing the electronic payment credential 402. The acquirer system 312 can authorize the transaction based at least in part on the account information 420. Authorizing can comprise determining whether the mobile electronic device 324 initiating the transaction is one of the electronic devices 411-413 authorized to use the identified account 410, i.e., authorized to use the electronic payment credential.

In some cases, the information identifying the electronic device presenting the payment credential can comprise a unique static identifier. For example, the unique static identifier can comprise a device serial number for the mobile electronic device 324. In other cases, the information identifying the electronic device presenting the payment credential can comprise a unique dynamic identifier. For example, the acquirer system 312 can be adapted to, prior to receiving the request 403 to authorize the transaction, generate a unique device identifier, save the unique device identifier in the information identifying the account 410 or 411, and transfer the unique device identifier to the electronic device 324. Transferring or provisioning the identifier to the mobile device 324 can be achieved in any of a number of different ways. Exemplary methods and systems that may be used for achieving this provisioning are described in U.S. patent application Ser. No. 11/830,420 filed Jul. 30, 2007 and entitled "Provisioning of a Device for Mobile Commerce", the entire disclosure of which is incorporated herein by reference for all purposes. The acquirer system 312 can then, after authorizing the transaction, generate a new unique device identifier, save the new unique device identifier in the information identifying the account, and transfer the new unique device identifier to the electronic device for use in authorizing subsequent transactions. Alternatively, the unique dynamic identifier can comprise a combination of an account number for the account and a random value. For example, the random value can comprise an elapsed time since a previous transaction, a time of occurrence of a last transaction, Greenwich Mean Time (GMT), or other value known or determinable to both the mobile device 324 and the acquirer system 312.

Figure 5:
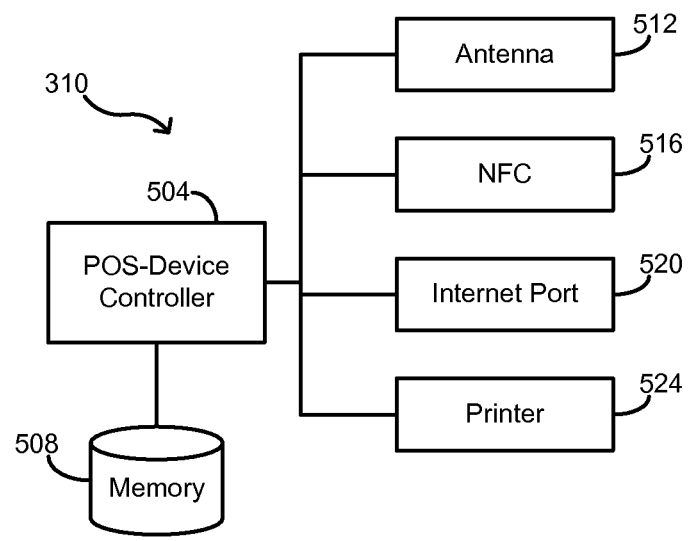
FIG. 5 is a block diagram illustrating components of an exemplary point of sale device that may be used with various embodiments of the present invention.

FIG. 5 is a block diagram illustrating components of an exemplary point of sale device that may be used with various embodiments of the present invention. Operations performed by the point-of-sale device 310 are generally coordinated by a controller 504, which is provided in electrical communication with a number of components. For example, the controller 504 can comprise a microprocessor or other computing device executing software stored, for example, in memory 508. Components with which the controller 504 is coupled can include an antenna 512 for transmitting and receiving electromagnetic signals and an NFC module 516 that provides instructions for implementing a communications protocol, such as an NFC protocol. The NFC module 516 performs a more active role than the antenna 512, determining what electromagnetic signals to transmit over the antenna 512 and/or interpreting electromagnetic signals that are received by the antenna 512. A port may be provided to permit the exchange of wired communications with the point-of-sale device 504, one example of the port being a TCP/IP port 520 that enables the point-of-sale device 504 to engage in Internet communications. A printer 524 interfaced with the controller 504 permits receipts and other documents to be printed by the point-of-sale device 504.

Figure 6:
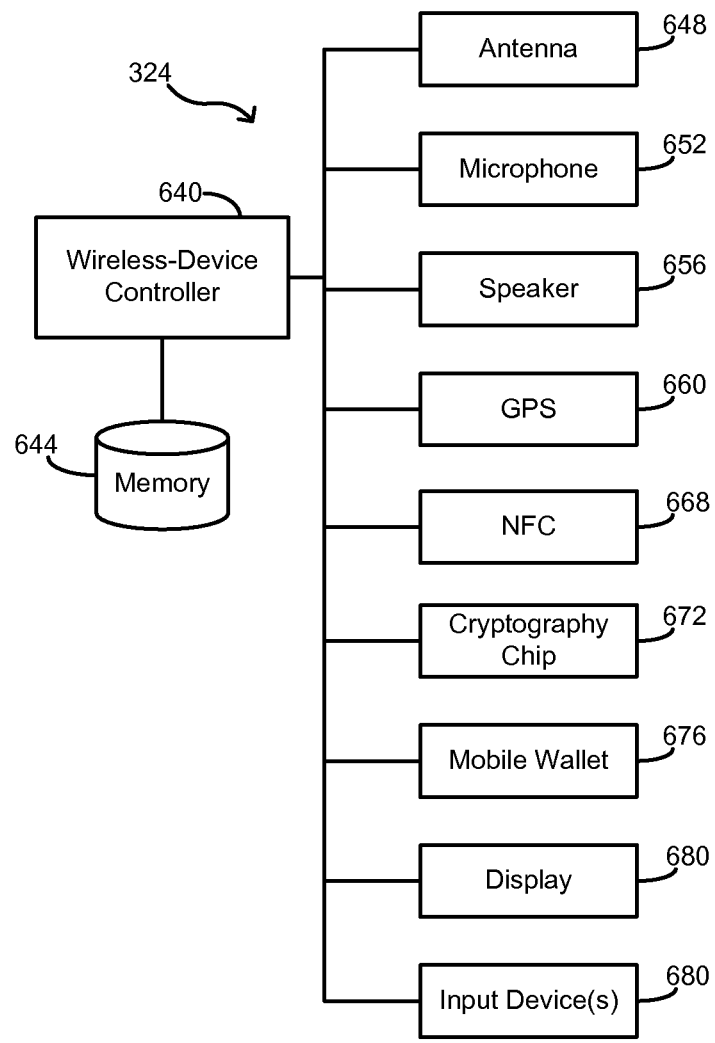
FIG. 6 is a block diagram illustrating components of an exemplary mobile device that may be used in various embodiments of the present invention.

FIG. 6 is a block diagram illustrating components of an exemplary mobile device that may be used with various embodiments of the present invention. The mobile device 324 includes a controller 640 which can comprise a microprocessor or other computing device executing software stored, for example, in memory 644 for coordinating the functions of a variety of components. Several of the components that may be controlled by the controller 540 include components used for standard functionality of the mobile device 324. For instance, in embodiments where the mobile device 324 is a cellular telephone, the controller may be interfaced with a microphone 652, a speaker 656, and an antenna 648. The microphone 652 and speaker 656 may be used to receive and amplify voice signals that are exchanged by users of the cellular telephone. The antenna 648 may be used to transmit and receive electromagnetic signals that correspond to encoded versions of the voice signals being exchanged.

Other components may include a global positioning system 660 that may be used to locate a position of the wireless device. Such a global positioning system 660 functions by transmitting an electromagnetic signal to an orbiting satellite that identifies a relative location of the source of the signal and correlates that relative position with a geographical map of a region of the Earth. An NFC module 668 may also be provided to encode and decode transmissions sent and received electromagnetically with the point of sale device as discussed above. Because transmissions involving the account information include sensitive financial data such as account numbers, a cryptography module 672 may also be provided to allow encryption of data sent and received by the mobile device 324 via the NFC module 668.

According to one embodiment, the mobile device 324 can also include a mobile wallet module or application 676. The mobile wallet 676 can be adapted to store payment vehicle information, i.e., an electronic payment credential and/or other information identifying one or more financial accounts such as credit accounts, debit accounts, demand deposit accounts, stored value accounts, etc. In some cases, the mobile wallet 676 can allow storage of multiple payment vehicles and can provide a user interface that can be displayed on a screen or display device 680 and through which the user can select a specific payment vehicle by manipulating a keypad, wheel, touch screen, or other input device 682. The mobile device 324, for example via the mobile wallet application 676, may allow the user to review accounts that are stored in the memory 644 of the mobile device 324 and select an account for a particular transaction such as a purchase. Upon selection of an account for use in the transaction, the user of the mobile device 324 can scan or swipe the device 624 in front of or near the POS device causing some or all of the information identifying the selected account to be read from the mobile device 324 via the NFC connection module 668.

Figure 7:
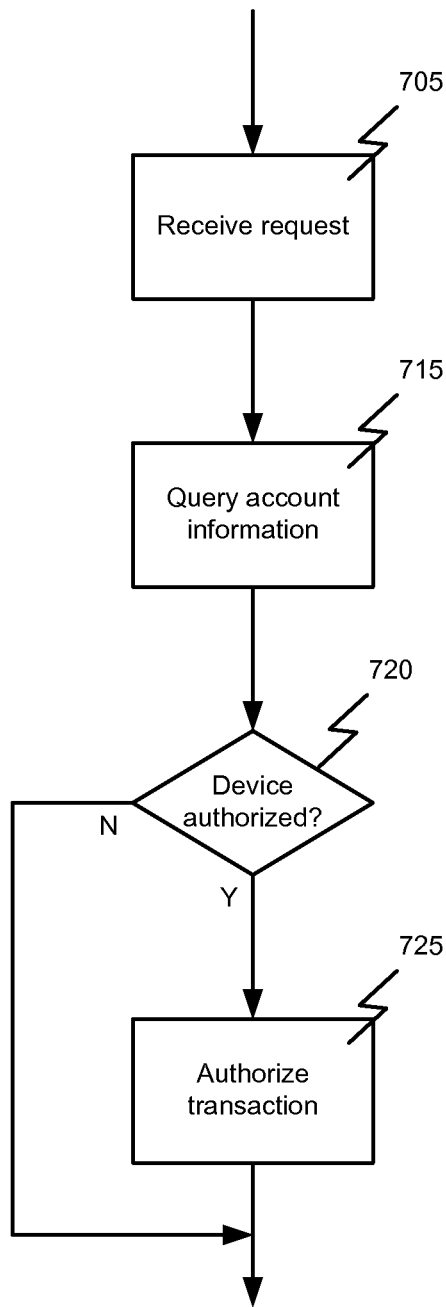
FIG. 7 is a flowchart illustrating a process for authorizing a financial transaction utilizing an electronic payment credential according to one embodiment of the present invention.

FIG. 7 is a flowchart illustrating a process for authorizing a financial transaction utilizing an electronic payment credential according to one embodiment of the present invention. As described above, such a process may be performed by an acquirer or other such system to authorize a transaction such as a sale that may be initiated by a mobile device via a point-of-sale or other device. In this example, processing begins with receiving 705 a request to authorize the transaction. As noted above, the acquirer or other authorizing system can maintain information identifying an account associated with the electronic payment credential. The information can also identify one or more electronic devices authorized to use the electronic payment credential. Therefore, upon receiving 705 the request to authorize the transaction, the acquirer or other authorizing system can query 715 the account information or otherwise look up or read the information related to the account or credential identified by the request.

Also as noted above, the request can include information identifying an electronic device presenting the payment credential. As noted, the information identifying the electronic device that can be included in the request can be a static identifier. For example, the static identifier can comprise a serial number of the electronic device or any other static, unique, and identifiable information that can be used by the acquirer system or other authorizing system to uniquely identify the device. Alternatively, the identifying information can comprise a unique dynamic identifier. Exemplary methods for handling unique dynamic identifiers are described below with reference to FIGS. 8 and 9.

Regardless of the exact form of the identifier, a determination 720 can be made as to whether the electronic device presenting the payment credential, i.e., the device identified in the request, is one of the electronic devices authorized to use the electronic payment credential. In response to determining the device is identified in the account information as an authorized device, the transaction can be authorized 725, for example by sending an authorization message to the requesting point-of-sale or other device. That is, the transaction can be authorized based at least in part on the information identifying the account.

Figure 8:
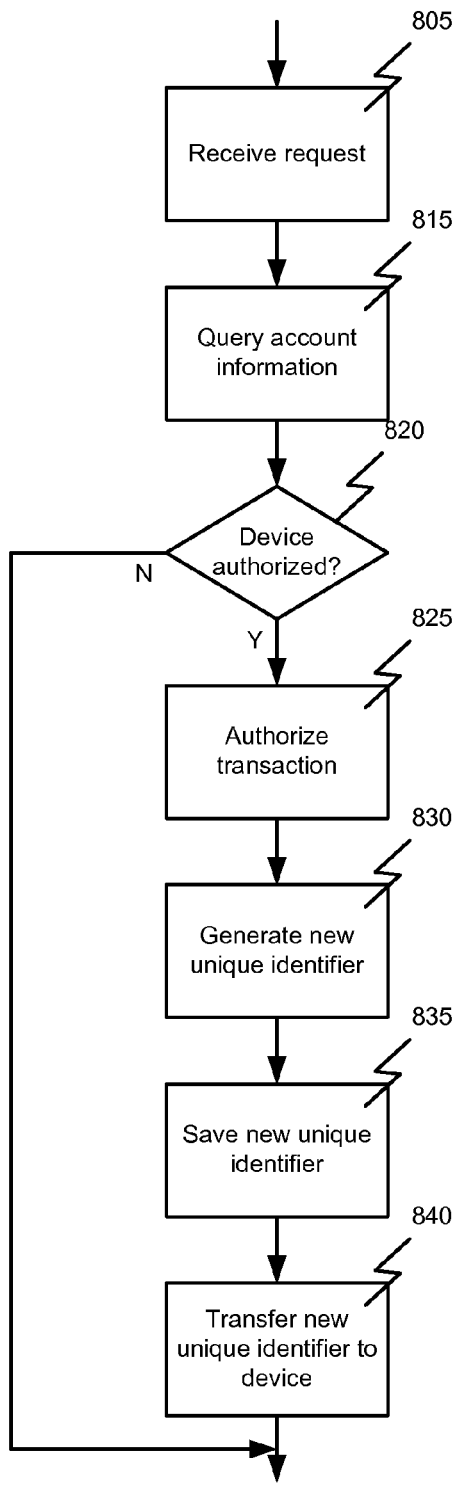
FIG. 8 is a flowchart illustrating a process for implementing a unique dynamic identifier according to one embodiment of the present invention.

FIG. 8 is a flowchart illustrating a process for implementing a unique dynamic identifier according to one embodiment of the present invention. It should become clear that this example presupposes that a unique identifier has already been provided to the mobile device for use in a request. That is, prior to receiving the request to authorize the transaction, a unique device identifier can be generated, saved in the information identifying the account, and transferred to the electronic device.

In this example, as in the previous example, processing begins with receiving 805 a request to authorize the transaction. As noted above, the acquirer or other authorizing system can maintain information identifying an account associated with the electronic payment credential. The information can also identify one or more electronic devices authorized to use the electronic payment credential. Therefore, upon receiving 805 the request to authorize the transaction, the acquirer or other authorizing system can query 815 the account information or otherwise look up or read the information related to the account identified by the request.

A determination 820 can be made as to whether the electronic device presenting the payment credential, i.e., the device identified in the request, is one of the electronic devices authorized to use the electronic payment credential. In response to determining the device is identified in the account information as an authorized device, the transaction can be authorized 825, for example by sending an authorization message to the requesting point-of-sale or other device. That is, the transaction can be authorized based at least in part on the information identifying the account. After authorizing 825 the transaction, a new unique device identifier can be generated 830, saved 835 in the information identifying the account, and transferred 840 to the electronic device for use in authorizing subsequent transactions. That is, the acquirer system or other authorizing system can provide a new unique identifier to the device for use in subsequent transactions.

Figure 9:
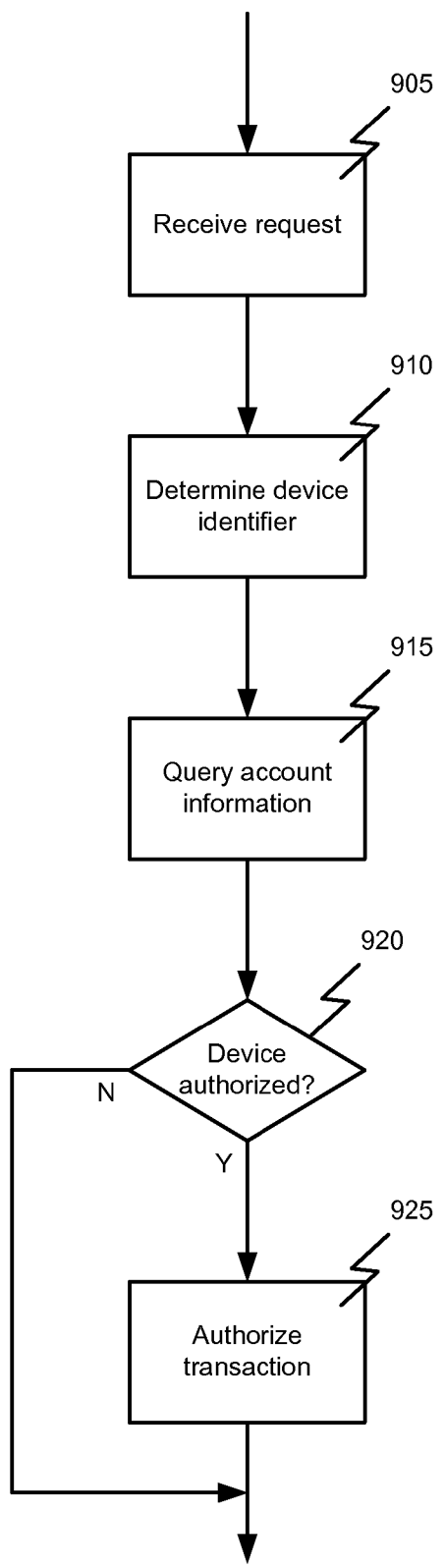
FIG. 9 is a flowchart illustrating a process for implementing a unique dynamic identifier according to an alternative embodiment of the present invention.

FIG. 9 is a flowchart illustrating a process for implementing a unique dynamic identifier according to an alternative embodiment of the present invention. In this example, as in the previous examples, processing begins with receiving 905 a request to authorize the transaction. As noted above, the acquirer or other authorizing system can maintain information identifying an account associated with the electronic payment credential. The information can also identify one or more electronic devices authorized to use the electronic payment credential. In this example, the information identifying the device can comprise a unique dynamic identifier that comprises a combination of the account number and another random value. For example, the random value can comprise an elapsed time since a previous transaction, a time of occurrence of a last transaction, Greenwich Mean Time (GMT), or other value known and/or determinable to both the mobile device as the acquirer or other authorizing system. This random value can be combined with the account number in a manner, i.e, via an algorithm, also known to both the mobile device and the acquirer or other authorizing system. Thus, upon receiving 905 the request to authorize the transaction, the acquirer or other authorizing system can determine the determine 910 the mobile device identifier based on the information receive in the request, i.e., by applying the known algorithm and the known or determinable random value.

The acquirer or other authorizing system can then query 915 the account information or otherwise look up or read the information related to the account identified by the request. A determination 920 can be made as to whether the electronic device presenting the payment credential, i.e., the device identified in the request, is one of the electronic devices authorized to use the electronic payment credential. In response to determining the device is identified in the account information as an authorized device, the transaction can be authorized 925, for example by sending an authorization message to the requesting point-of-sale or other device. That is, the transaction can be authorized based at least in part on the information identifying the account.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for authorizing, at an acquirer system, a financial transaction utilizing an electronic payment credential, the method comprising:

maintaining, at the acquirer system, information identifying at least one of a plurality of funding accounts associated with the electronic payment credential, the maintained information identifying at least one electronic device authorized to use the electronic payment credential, the information identifying the at least one electronic device comprising a unique dynamic identifier, the unique dynamic identifier comprising a combination of an account number for a particular account and a random value, the random value comprising an elapsed time since a previous transaction;

prior to receiving a request to authorize a financial transaction, generating the unique dynamic identifier, saving the unique dynamic identifier as part of the maintained information identifying the funding accounts, and transferring the unique dynamic identifier from the acquirer system to the electronic device, thereby provisioning a mobile wallet resident at the electronic device in order to manage and store the unique dynamic identifier:

communicating, from the electronic device through a point-of-sale device to the acquirer system, using NFC communications between the electronic device and the point-of-sale device;

initiating the financial transaction in one communication by transmitting the electronic payment credential, information identifying the particular account, and the unique dynamic identifier, from the electronic device to the point-of-sale device in the one communication using NFC communications, prior to the acquirer system receiving any communication regarding the financial transaction from the point-of-sale device;

receiving, at the acquirer system, a request to authorize the financial transaction from the point-of-sale device, wherein the request includes information identifying;
the electronic payment credential;
the particular account; and
the unique dynamic identifier;

authorizing the financial transaction at the acquirer system based at least in part on the information identifying the particular account and whether a particular electronic device presenting the electronic payment credential is an electronic device authorized to use the electronic payment credential; and in response to authorizing the transaction, generating a new unique dynamic identifier, saving the new unique dynamic identifier as part of the maintained information identifying the plurality of funding accounts, and transferring the new unique dynamic identifier from the acquirer system to the electronic device thereby re-provisioning the mobile wallet for use in authorizing subsequent transactions.

2. The method of claim 1, wherein the electronic payment credential comprises a credential representing a pre-paid account.

3. The method of claim 2, wherein the pre-paid account comprises a gift card account.

4. The method of claim 1, wherein the electronic payment credential comprises a credential representing a credit card account.

5. The method of claim 1, wherein the electronic device is a mobile wireless device and wherein transferring the unique dynamic identifier from the acquirer system to the electronic device to provision the mobile wallet comprises wireless communications via a wireless service provider network.

6. The method of claim 1, wherein the electronic device may use more than one funding account, and wherein a user of the electronic device selects the particular account at the electronic device.

7. The method of claim 1, wherein more than one electronic device is authorized to use the particular account.

8. A system for authorizing a financial transaction utilizing an electronic payment credential, the system comprising a point-of-sale device and an acquirer system:

the-point-of-sale device configured to:
 receive in one communication, using NFC communications, the electronic payment credential, a unique dynamic identifier, and a selected account from a mobile electronic device; and
 initiate, after receiving the electronic payment credential, the unique dynamic identifier, and the selected account, the financial transaction utilizing the electronic payment credential, prior to the acquirer system receiving any communication regarding the financial transaction from the point-of-sale device; and the acquirer system configured to:
 maintain information identifying:
  a plurality of accounts associated with the electronic payment credential; and
  a plurality of mobile electronic devices authorized to use each account of the electronic payment credential, the information identifying each of the electronic devices comprising the unique dynamic identifier, with the unique dynamic identifier comprising a combination of an account number for one of the accounts and a random value, the random value comprises an elapsed time since a previous transaction;
 prior to receiving a request to authorize a financial transaction, generate the unique dynamic identifier, saving the unique dynamic identifier as part of the maintained information associated with the electronic payment credential, and transferring the unique dynamic identifier from the acquirer system to a mobile electronic device, thereby provisioning a mobile wallet resident at the mobile electronic device in order to manage and store the unique dynamic identifier;
 receive a request to authorize the financial transaction from the point-of-sale device, wherein the request includes:
  information identifying the mobile electronic device initiating the financial transaction utilizing the electronic payment credential;
  information identifying the selected account; and
  the unique dynamic identifier, and
 authorize the financial transaction at the acquirer system based at least in part on the information identifying the selected account, wherein authorizing the transaction comprises determining:
  whether the mobile electronic device initiating the financial transaction is one of the plurality of mobile electronic devices authorized to use the electronic payment credential; and
  whether the selected account is one of the plurality of accounts authorized for the mobile electronic device; and
 in response to authorizing the transaction, generate a new unique dynamic identifier, saving the new unique dynamic identifier as part of the maintained information identifying the plurality of accounts, and transferring the new unique dynamic identifier from the acquirer system to the mobile electronic device, thereby re-provisioning the mobile wallet and for use in authorizing subsequent transactions.

9. The system of claim 8, wherein the electronic payment credential comprises a credential representing a pre-paid account.

10. The system of claim 9, wherein the pre-paid account comprises a gift card account.

11. The system of claim 8, wherein the electronic payment credential comprises a credential representing a credit card account.

12. The system of claim 8, wherein transferring the unique dynamic identifier from the acquirer system to the mobile electronic device to provision the mobile wallet comprises wireless communications via a wireless service provider network.

13. The system of claim 8, wherein a user of the mobile electronic device selects the selected account at the mobile electronic device.

* * * * *